US012326224B2

(12) United States Patent
Kataoka

(10) Patent No.: US 12,326,224 B2
(45) Date of Patent: Jun. 10, 2025

(54) HIGH-PRESSURE TANK

(71) Applicant: TOYOTA JIDOSHA KABUSHIKI KAISHA, Toyota (JP)

(72) Inventor: Chiaki Kataoka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 18/489,265

(22) Filed: Oct. 18, 2023

(65) Prior Publication Data

US 2024/0200727 A1 Jun. 20, 2024

(30) Foreign Application Priority Data

Dec. 14, 2022 (JP) ................................ 2022-199562

(51) Int. Cl.
*F17C 13/04* (2006.01)

(52) U.S. Cl.
CPC ...... *F17C 13/04* (2013.01); *F17C 2205/0305* (2013.01); *F17C 2205/0329* (2013.01); *F17C 2205/0382* (2013.01); *F17C 2223/035* (2013.01)

(58) Field of Classification Search
CPC .. F17C 13/04; F17C 13/12; F17C 2205/0305; F17C 2205/0329; F17C 2205/0382; F17C 2223/035; F17C 5/02
USPC ...................................................... 251/149.6
See application file for complete search history.

(56) References Cited

U.S. PATENT DOCUMENTS

| | | | | | |
|---|---|---|---|---|---|
| 4,077,422 | A * | 3/1978 | Brinkley | F17C 13/12 | 137/68.14 |
| 5,103,860 | A * | 4/1992 | Morris | F17C 13/123 | 137/460 |
| 10,738,945 | B2 * | 8/2020 | Tilhof | F17C 5/02 | |
| 2003/0121555 | A1 * | 7/2003 | Kroupa | F16K 1/52 | 137/636 |
| 2012/0247587 | A1 * | 10/2012 | Davis | F16K 37/0008 | 137/556 |
| 2021/0285604 | A1 * | 9/2021 | Kim | F17C 7/04 | |

FOREIGN PATENT DOCUMENTS

| | | | | |
|---|---|---|---|---|
| GB | 1009072 | A * | 11/1965 | |
| JP | 60109700 | A * | 6/1985 | |
| JP | 2004036768 | A * | 2/2004 | F16K 1/303 |
| JP | 2006-177538 | A | 7/2006 | |

* cited by examiner

*Primary Examiner* — Jessica Cahill
(74) *Attorney, Agent, or Firm* — SoraIP, Inc.

(57) ABSTRACT

The high pressure tank includes a tank body, a valve, and a handle unit. The valve includes a first body provided with a first housing hole and a first communication hole communicating with the first communication hole, a second body provided with a second communication hole communicating with the first housing hole and a second housing hole communicating with the second communication hole, a connector portion provided with a through hole communicating with the second housing hole, a second valve disc blocking the communication between the through hole and the second housing hole and allowing the communication between the through hole and the second housing hole by the pushing force of the pushing pin, and a handle portion that can be fitted into the handle receiving groove on the gas supply target side. The first valve disc opens and closes with an operation of twisting the handle unit.

1 Claim, 6 Drawing Sheets

HIGH-PRESSURE TANK

CROSS-REFERENCE TO RELATED APPLICATION

This application claims priority to Japanese Patent Application No. 2022-199562 filed on Dec. 14, 2022, incorporated herein by reference in its entirety.

BACKGROUND

1. Technical Field

The present disclosure relates to high-pressure tanks, and particularly to a high-pressure tank including a valve mounted in a boss portion.

2. Description of Related Art

Conventionally, a high-pressure tank is known in this technical field in which a valve unit including a body housing, a sub-housing, a main valve, and a sub-valve is mounted in a boss portion of a tank body as described in, for example, Japanese Unexamined Patent Application Publication No. 2006-177538 (JP 2006-177538 A). The main valve includes a valve mechanism, and the sub-valve is biased to a closed state by a biasing unit. A protruding portion of the main valve moves the sub-valve to an open state against the biasing force of the biasing unit. With the sub-valve moved from the closed state, communication between the main valve and the outside of the tank body is blocked by a sealing member.

In the high-pressure tank having such a structure, when the valve mechanism of the main valve breaks and replacement of the main valve is necessary, the protruding portion is moved so as not to bias the sub-valve to the open state, so that the sub-valve is returned to the closed state by the action of the biasing unit. A through hole for guiding gas in the tank body to the outside is thus closed by the sub-valve. In this state, the main valve is removed from a mount portion, and a normal main valve is mounted in the mount portion. This configuration can prevent outside air from entering the tank body and also prevent the gas stored in the tank body from flowing out of the tank body during replacement of the main valve mounted in the boss portion.

SUMMARY

In the above high-pressure tank, however, it is difficult to quickly stop gas leakage when the gas leakage occurs in the main valve or the sub-valve due to biting of foreign matter, a stuck open valve, etc.

The present disclosure was made to solve such a technical problem, and it is an object of the present disclosure to provide a high-pressure tank capable of quickly stopping gas leakage when the gas leakage occurs in a valve.

A high-pressure tank according to the present disclosure includes: a tank body that stores gas; a valve mounted to the tank body; and a handle unit attached to an opposite side of the tank body from the valve.

The high-pressure tank is characterized in that the valve includes a first body mounted in a boss portion of the tank body and having, inside the first body, a first communication hole and a first housing hole, the first communication hole communicating with inside of the tank body, and the first housing hole communicating with the first communication hole and having a larger diameter than the first communication hole, a second body having, inside the second body, a second communication hole and a second housing hole and including a first valve disc, the second communication hole communicating with the first housing hole, the second housing hole communicating with the second communication hole and having a larger diameter than the second communication hole, and the first valve disc being housed in the first housing hole and configured to block or allow communication between the first housing hole and the first communication hole, a connector portion connected to the second body and having, inside the connector portion, a through hole communicating with the second housing hole, the connector portion being configured to be fitted in a gas supply target to which the gas is to be supplied, a second valve disc housed in the second housing hole, the second valve disc being configured to block communication between the through hole and the second housing hole by a biasing force of a spring, and configured to allow the communication between the through hole and the second housing hole by a pushing force of a pushing pin of the gas supply target, and a handle portion protruding from the second body in a radial direction of the tank body, the handle portion being configured to be fitted in a handle receiving groove of the gas supply target when the high-pressure tank is fitted in the gas supply target via the connector portion, and with the handle portion fitted in the handle receiving groove of the gas supply target, the first valve disc blocks or allows the communication between the first housing hole and the first communication hole with an operation of twisting the handle unit.

In the high-pressure tank according to the present disclosure, with the handle portion fitted in the handle receiving groove of the gas supply target, the first valve disc blocks or allows the communication between the first housing hole and the first communication hole with an operation of twisting the handle unit. Therefore, opening and closing of the first valve disc can be implemented only by the operation of twisting the handle portion. Therefore, if gas leakage occurs in the valve, the communication between the first housing hole and the first communication hole can be easily blocked by the operation of twisting the handle unit, and the gas leakage can be stopped. As a result, gas leakage can be stopped quickly when the gas leakage occurs in the valve.

According to the present disclosure, gas leakage can be stopped quickly when the gas leakage occurs in a valve.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
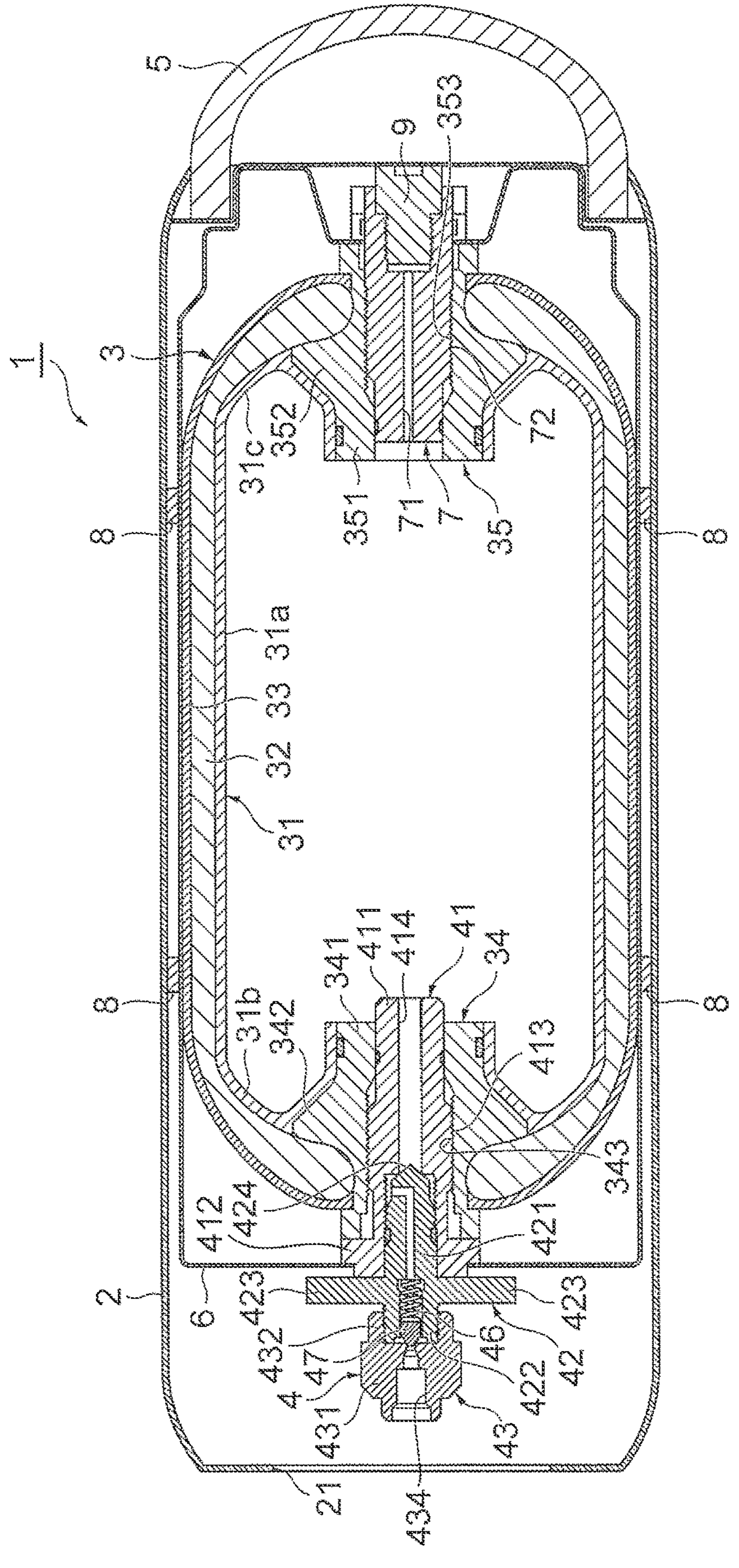
FIG. 1 is a schematic cross-sectional view illustrating a high-pressure tank according to an embodiment.

Hereinafter, an embodiment of a high-pressure tank according to the present disclosure will be described with reference to the drawings. In the following description, each of the left and right directions is a convenient direction corresponding to the state displayed in the drawings, and does not limit the posture or arrangement of the high-pressure tank. In the following explanation, hydrogen gas is filled in the high-pressure tank, but the gas that can be filled in the high-pressure tank is not limited to hydrogen gas, and may be compressed gas such as CNG (compressed natural gas), or various types of liquefied gas such as LNG (liquefied natural gas) or LPG (liquefied petroleum gas).

Figure 2:
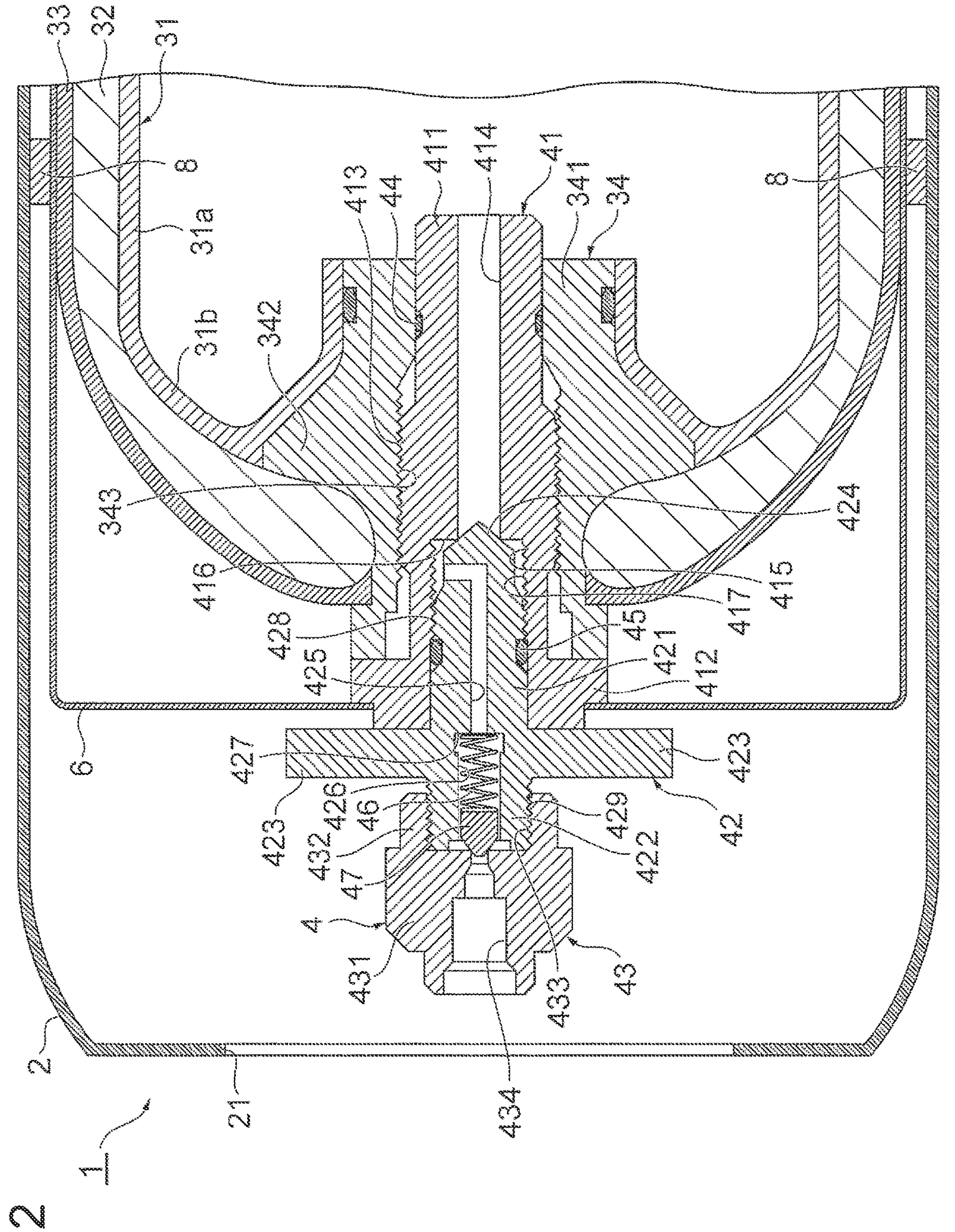
FIG. 2 is an enlarged cross-sectional view showing a valve.

FIG. 1 is a schematic cross-sectional view showing a high-pressure tank according to an embodiment, and FIG. 2 is an enlarged cross-sectional view showing a valve. As shown in FIG. 1, the high-pressure tank 1 of the present embodiment is, for example, a cylindrical tank with a handle applied to a portable hydrogen cartridge container, and is used for various applications (i.e., gas supply targets) such as a moving means like a drone, a two-wheeled vehicle, and a four-wheeled vehicle, and a household power supply. The high-pressure tank 1 includes a cylindrical case 2, a tank body 3 and a valve 4 housed in the case 2, and a handle unit 5 attached to one end portion of the case 2 and exposed to the outside of the case 2.

The case 2 is made of, for example, a hard resin material. A rectangular case opening 21 is formed in the center of the end portion of the case 2 opposite to the handle unit 5 (see FIG. 4). The tank body 3, the valve 4, and the safety valve body 7 and the safety valve 9, which will be described later, are supported by a support 6 made of a metal material or a hard resin material. The support 6 is, for example, a frame body fixed to the tank body 3, and is fixed to the inner wall of the case 2 via a plurality of attachment members 8.

The tank body 3 is a substantially cylindrical high-pressure gas storage container having both ends rounded in a dome shape, and has a liner 31 having gas barrier properties, a first fiber-reinforced resin layer 32 formed so as to cover the outer peripheral surface of the liner 31, and a second fiber-reinforced resin layer 33 covering the first fiber-reinforced resin layer 32. The liner 31 is a hollow container having a storage space for storing hydrogen gas, and is formed of a resin material having a gas barrier property against hydrogen gas. The liner 31 has a cylindrical body portion 31*a* and a pair of dome portions (a left dome portion 31*b* and a right dome portion 31*c*) provided at both ends of the body portion 31*a*. Each of the left dome portion 31*b* and the right dome portion 31*c* has a hemispherical shape. The resin constituting the liner 31 may be any resin as long as it has good gas barrier properties, and examples thereof include thermoplastic resins such as polyamide, polyethylene, and ethylene-vinyl alcohol copolymer resin (EVOH), polyester, and thermosetting resins such as epoxy.

The first fiber-reinforced resin layer 32 and the second fiber-reinforced resin layer 33 have a function of reinforcing the liner 31 to improve mechanical strength such as rigidity and pressure resistance of the high-pressure tank 1, and each has a plurality of layers formed of fiber-reinforced resin. The fiber-reinforced resin is formed, for example, by impregnating a fiber bundle formed by bundling fibers having a diameter of about several micrometers with a thermosetting resin or a thermoplastic resin. Examples of the fibers include reinforcing fibers such as carbon fibers, glass fibers, aramid fibers, alumina fibers, boron fibers, steel fibers, PBO fibers, natural fibers, or high-strength polyethylene fibers, and it is preferable to use carbon fibers from the viewpoint of, for example, lightness and mechanical strength.

Examples of the thermosetting resin include epoxy resins, modified epoxy resins typified by vinyl ester resins, phenolic resins, melamine resins, urea resins, unsaturated polyester resins, alkyd resins, polyurethane resins, and thermosetting polyimide resins. Examples of the thermoplastic resin include polyether ether ketone, polyphenylene sulfide, polyacrylic acid ester, polyimide, and polyamide.

Openings are formed at both ends of the tank body 3, and boss portions 34, are mounted in the openings. Specifically, as shown in FIG. 1, a boss portion 34 is inserted into an opening portion of the tank body 3 having the left dome portion 31*b*, and a boss portion 35 is inserted into an opening portion of the tank body 3 having the right dome portion 31*c*. The boss portion 34 functions as a valve-side base, and the above-described 25 valve 4 is mounted therein. On the other hand, the boss portion 35 functions as a base on the safety valve side, and the safety valve body 7 is mounted therein.

The boss portions 34, 35 are each formed in a substantially cylindrical shape by a metal material such as stainless steel or an aluminum alloy. One end of each of the boss portions 34, 35 is inserted into the opening, and the other end of each of the boss portions 34, 35 protrudes to the outside of the high-pressure tank 1 along the axial direction of the high-pressure tank 1. More specifically, the boss portions 34, 35 have a substantially cylindrical base body portion 341, 351 extending along the axial direction of the high-pressure tank 1, and a flange portion 342,352 integrally formed with the base body portion 341,351 and protruding in the radial direction of the high-pressure tank 1. A female screw portion 343 for screwing with the valve 4 is formed on the inner peripheral wall of the base body portion 341, and a female screw portion 353 for screwing with the safety valve body 7 is formed on the inner peripheral wall of the base body portion 351.

The safety valve body 7 is made of a metal material such as stainless steel or an aluminum alloy. As shown in FIG. 1, the safety valve body 7 has a substantially cylindrical shape, and a through hole 71 communicating with the inside of the tank body 3 is formed therein. A male screw portion 72 is formed on a part of the outer peripheral wall of the safety valve body 7. The safety valve body 7 having such a structure is attached to the boss portion 35 so as to close the boss portion 35, and is fastened to the boss portion 35 by screwing the male screw portion 72 and the female screw portion 353 of the boss portion 35. A safety valve 9 made of metal is mounted in the safety valve body 7.

The safety valve 9 is, for example, a thermally-activated pressure relief device, and is a safety device that discharges the gases in the tank body 3 to the outside when a fire or the like is detected.

The handle unit 5 is a so-called handle, and is made of, for example, a hard resin material. The handle unit 5 has an arcuate shape protruding outward from the case 2 so as to be easily gripped by a user of the high-pressure tank 1 and easily twisted.

On the other hand, the valve 4 is a member for discharging the hydrogen gas stored in the tank body 3 to the gas supply target, and is formed of a metal material such as stainless steel or an aluminum alloy. As shown in FIG. 2, the valve 4 includes a first body 41 attached to the boss portion 34, a second body 42 having a portion to be inserted into the first body 41 and a portion exposed from the first body 41, and a connector portion 43 connected to the second body 42 and for fitting with the gas supply target.

The first body 41 is formed of a hollow cylindrical body having a substantially T-shaped cross section, and has an insertion portion 411 that extends in the axial direction of the high-pressure tank 1 and is inserted into the boss portion 34, a flange portion 412 that is exposed to the outside of the boss portion 34 and extends in the radial direction of the high-pressure tank 1, and a male screw portion 413 that is formed in a part of the outer peripheral wall of the insertion portion 411. The first body 41 having such a structure is inserted into the boss portion 34 until the flange portion 412 comes into contact with the distal end surface of the boss portion 34, and is fastened to the boss portion 34 by screwing the male screw portion 413 and the female screw portion 343 of the boss portion 34.

As shown in FIG. 2, in the insertion portion 411, a circumferential groove is provided closer to the inside of the tank body 3 than the male screw portion 413. An O-ring 44 that maintains the sealing property between the insertion portion 411 and the base body portion 341 of the boss portion 34 is fitted into the circumferential groove. In addition, a first communication hole 414 communicating with the inside of the tank body 3 and a first housing hole 415 communicating with the first communication hole 414 and having a larger diameter than the first communication hole 414 are provided inside the first body 41. The first communication hole 414 and the first housing hole 415 extend along the axial direction of the high-pressure tank 1 and are coaxially disposed.

A stepped portion 416 is formed between the first communication hole 414 having a relatively small diameter and the first housing hole 415 having a relatively large diameter. The edge portion of the stepped portion 416 constitutes a valve seat that comes into contact with and comes out of contact with the first valve disc 424 described later. Further, a female screw portion 417 is formed on an inner peripheral wall of the first housing hole 415 adjacent to the stepped portion 416.

The second body 42 is formed of a hollow cylindrical body having a substantially cross-shaped cross section, and has an insertion portion 421 that is inserted into the first body 41, an exposed portion 422 that is exposed from the first body 41, and a handle portion 423 that protrudes from the exposed portion 422 in the radial direction of the tank body 3 (that is, the radial direction of the high-pressure tank 1). The insertion portion 421 is inserted into the first housing hole 415 of the first body 41, and the exposed portion 422 is exposed from the first housing hole 415. The handle portion 423 is formed integrally with the exposed portion 422 and includes a pair of rod-shaped members extending in opposite directions from the exposed portion 422 (see FIG. 4). The handle portion 423 is formed so as to be fitted into a handle receiving groove 104 provided in the gas supply target 10 when the high-pressure tank 1 is fitted into the gas supply target 10 via the connector portion 43.

As shown in FIG. 2, a portion of the outer peripheral wall of the insertion portion 421 is formed with a male screw portion 428 that is threadedly engaged with the female screw portion 417 of the first body 41. A portion closer to the inside of the tank body 3 than the male screw portion 428 of the insertion portion 421 is reduced in diameter so as to create a space with the first housing hole 415. Further, the distal end portion of the insertion portion 421 is machined into a truncated cone shape, and constitutes a first valve disc 424 that blocks or permits communication between the first housing hole 415 and the first communication hole 414. Further, a peripheral groove is provided on the outer peripheral wall of the portion closer to the handle portion 423 than the male screw portion 428 of the inner insertion portion 421, and an O-ring 45 that maintains the sealing property between the inner insertion portion 421 and the peripheral wall of the first housing hole 415 is fitted into the peripheral groove. On the other hand, a male screw portion 429 for screwing with the connector portion 43 is formed on the outer peripheral wall of the exposed portion 422.

In addition, a second communication hole 425 communicating with the first housing hole 415 of the first body 41 and a second housing hole 426 communicating with the second communication hole 425 and having a larger diameter than the second communication hole 425 are provided inside the second body 42. The second communication hole 425 has a first portion extending along the axial direction of the high-pressure tank 1 and a second portion extending along the radial direction of the high-pressure tank 1. The second portion of the second communication hole 425 is located closer to the handle portion 423 than the first valve disc 424, and opens into a space between the insertion portion 421 and the first housing hole 415.

A stepped portion 427 is formed between the second communication hole 425 having a relatively small diameter and the second housing hole 426 having a relatively large diameter. The second housing hole 426 is disposed coaxially with the first portion of the second communication hole 425. A spring 46 and a second valve disc 47 are housed in the second housing hole 426. The stepped portion 427 functions as a restriction portion for restricting the spring 46.

As illustrated in FIG. 2, the spring 46 is disposed between the second valve disc 47 and the stepped portion 427, and biases the second valve disc 47 in a valve closing direction. The second valve disc 47 has a truncated conical shape that is reduced in diameter toward the connector portion 43 side. The second valve disc 47, the through hole 434 of the connector portion 43 by the biasing force of the spring 46 (described later) and the second housing hole 426 to shut off communication, and the second valve disc 47, the pushing force of the pushing pin 105 provided in the gas supply target 10 through hole 434 and the second housing hole 426 It is formed so as to allow communication.

The connector portion 43 is a member for fitting with the fitted portion 102 (described later) of the gas supply target 10. The connector portion 43 includes a receiving portion 431 that receives the plug portion 103 (described later) of the gas supply target 10, and a cylindrical threaded portion 432 that protrudes from the receiving portion 431 and is externally fitted to the exposed portion 422 of the second body 42. The receiving portion 431 and the threaded portion 432 are integrally formed.

A through hole 434 communicating with the second housing hole 426 of the second body 42 is formed inside the receiving portion 431. The through hole 434 has a stepped structure in which the inner diameter changes so as to regulate the insertion depth of the plug portion 103 of the gas supply target 10 inserted therein. Further, the inner peripheral wall of the threaded portion 432 is formed with a female screw portion 433 that is threadedly engaged with the male screw portion 429 of the second body 42. The connector portion 43 is fastened to the exposed portion 422 of the second body 42 by screwing the female screw portion 433 and the male screw portion 429 of the second body 42.

As shown in FIG. 2, in a state in which the connector portion 43 is connected to the second body 42, the communication between the through hole 434 and the second housing hole 426 of the second body 42 is blocked by the second valve disc 47.

Hereinafter, the opening and closing status of the valve 4 when the high-pressure tank 1 is attached to and detached from the gas supply target 10 will be described with reference to FIGS. 3 to 6.

Figure 3:
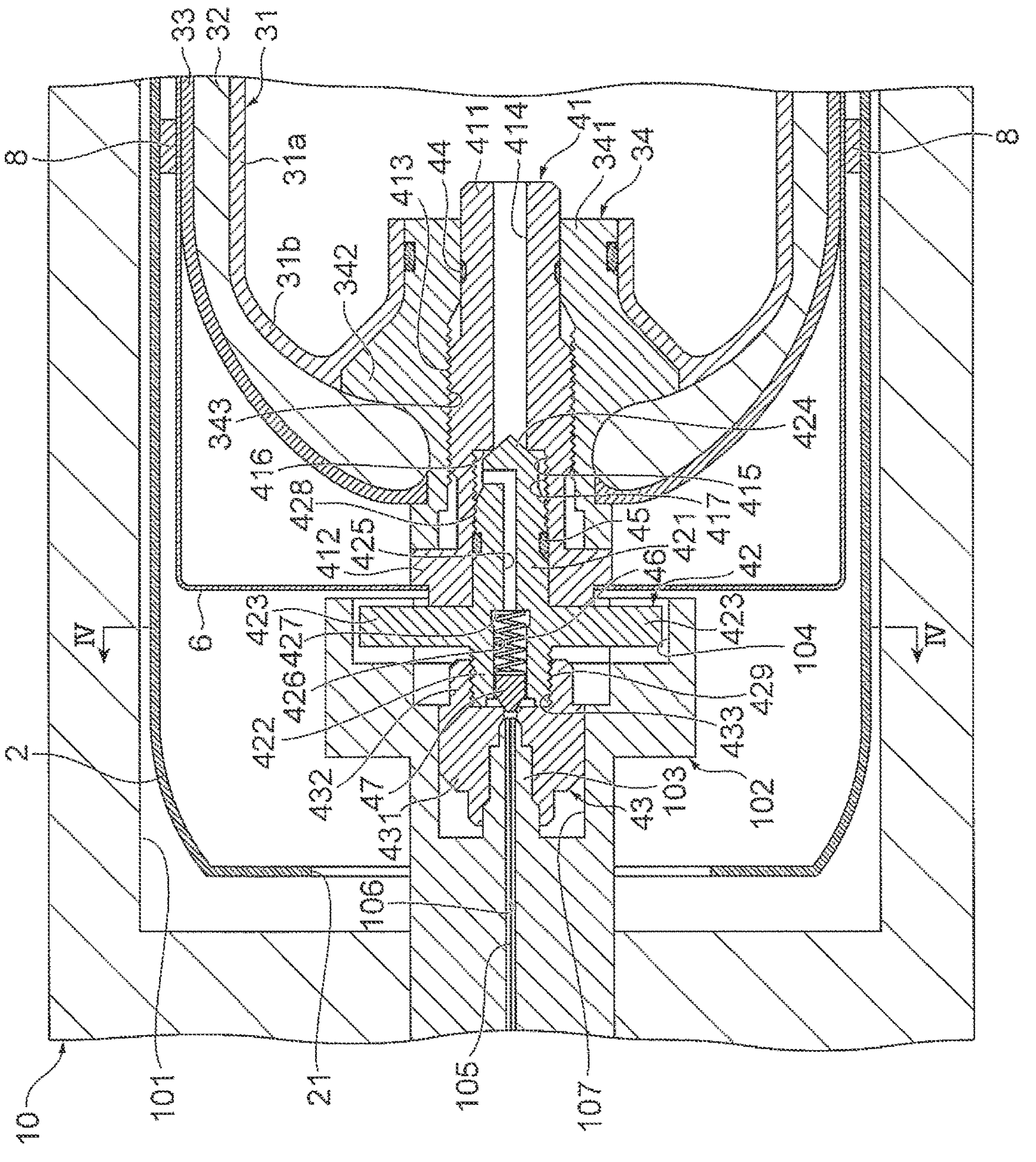
FIG. 3 is a cross-sectional view showing a state in which a high-pressure tank is fitted with a gas supply target.
Figure 4:
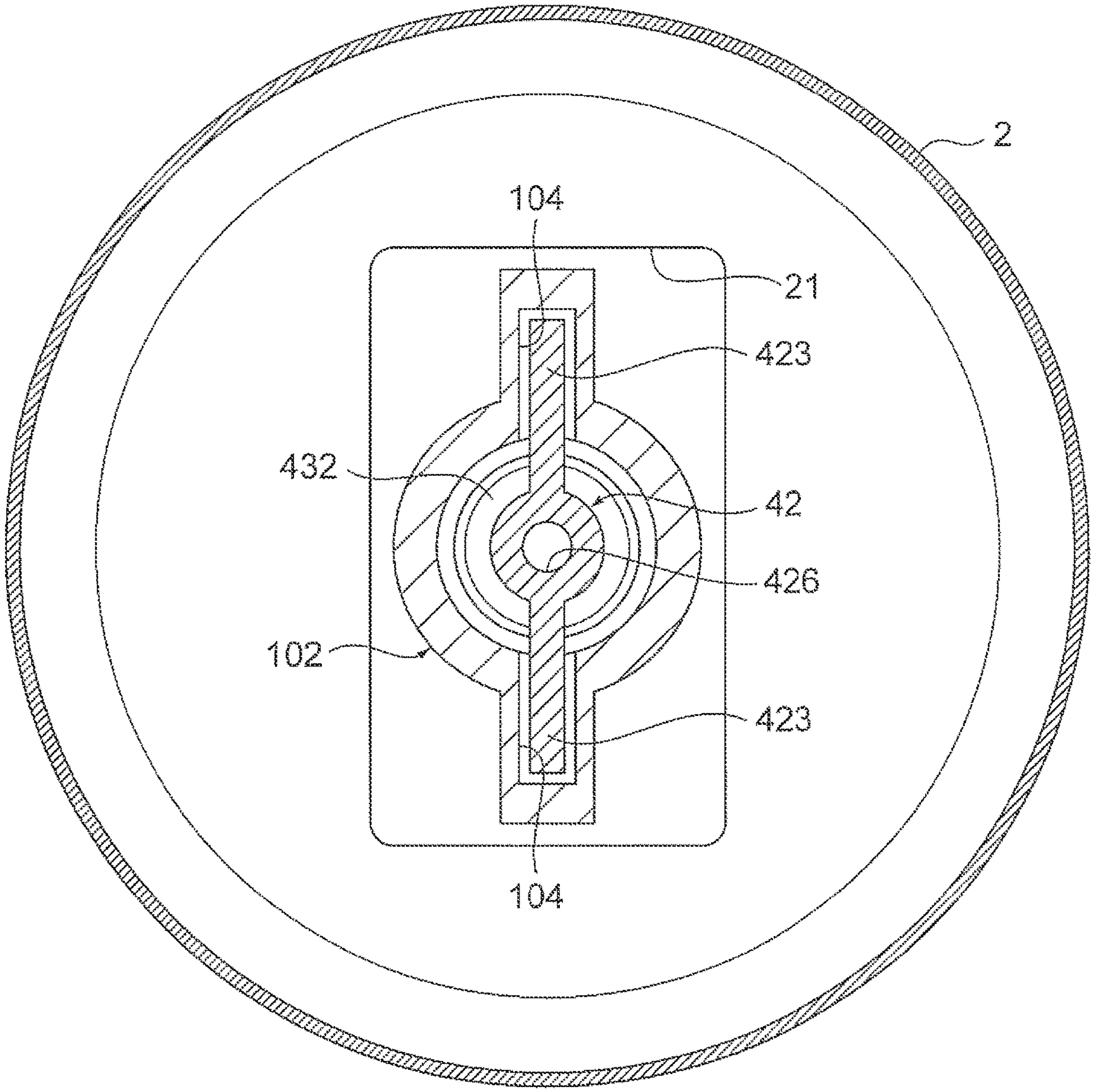
FIG. 4 is a cross-sectional view along IV-IV of FIG. 3.

First, the structure of the gas supply target 10 will be briefly described. As shown in FIGS. 3 and 4, the gas supply target 10 is, for example, the application to which the hydrogen gas in the high-pressure tank 1 is supplied, and includes a guide hole 101 through which the high-pressure tank 1 can be smoothly inserted, and a fitted portion 102 which is erected from the center of the bottom of the guide hole 101 and opens to the high-pressure tank 1 side. The fitted portion 102 is formed smaller than the case opening 21 so as to be smoothly inserted into the case opening 21 of the high-pressure tank 1. The fitted portion 102 has a plug portion 103 to be inserted into the through hole 434 of the connector portion 43, and a handle receiving groove 104 to receive the handle portion 423 of the high-pressure tank 1 in a state where the plug portion 103 is inserted into the through hole 434.

A housing hole 106 for housing the pushing pin 105 is formed in the center of the plug portion 103. The housing hole 106 is formed so as to be disposed coaxially with the through hole 434 in a state where the plug portion 103 is inserted into the through hole 434. The pushing pin 105 may protrude outward from the distal end of the plug portion 103 by, for example, a drive mechanism, or may return into the housing hole 106. Further, around the plug portion 103, a recess 107 into which the receiving portion 431 of the connector portion 43 of the high-pressure tank 1 can be inserted is formed. On the other hand, the handle receiving groove 104 has a side wall that restricts the handle portion 423 of the high-pressure tank 1 fitted therein.

When the high-pressure tank 1 is set in the gas supply target 10 and used, for example, the user grasps the handle unit 5 and inserts the high-pressure tank 1 into the guide hole 101 of the gas supply target 10 in a state in which the side where the valve 4 of the high-pressure tank 1 is disposed faces the gas supply target 10. As described above, since the case opening 21 is opened at the distal end portion of the case 2 of the high-pressure tank 1, the fitted portion 102 disposed at the bottom of the guide hole 101 enters the case 2 from the case opening 21 according to the insertion into the guide hole 101.

When the high-pressure tank 1 is completely inserted into the guide hole 101, the connector portion 43 of the high-pressure tank 1 is fitted into the fitted portion 102 of the gas supply target 10. That is, the plug portion 103 of the gas supply target 10 is inserted into the through hole 434 of the connector portion 43, and the handle portion 423 of the high-pressure tank 1 is fitted into the handle receiving groove 104 of the gas supply target 10.

In the present embodiment, from the viewpoint of ensuring the safe use of the high-pressure tank 1, it is determined that the high-pressure tank 1 is locked to the gas supply target 10 by rotating the high-pressure tank 1 inserted into the guide hole 101 of the gas supply target 10 counterclockwise, for example. For this reason, after the user completely inserts the high-pressure tank 1 into the guide hole 101, the high-pressure tank 1 is locked with the gas supply target 10 by twisting, for example, 45° counterclockwise while holding the handle unit 5 of the high-pressure tank 1.

Figure 5:
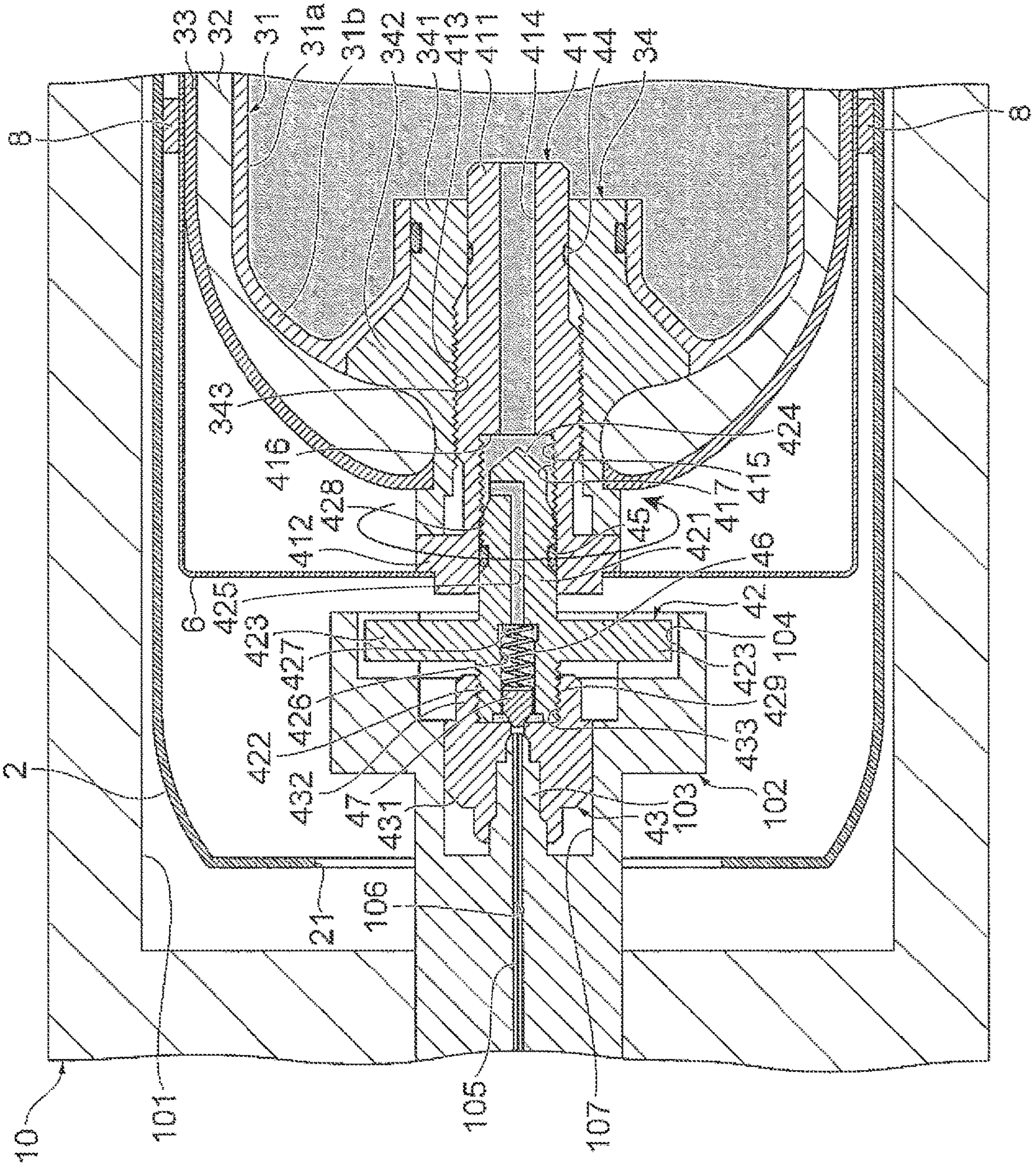
FIG. 5 is a cross-sectional view showing opening and closing of a valve associated with twisting of a handle unit in a state of being fitted with a gas supply target.

Since the handle portion 423 of the high-pressure tank 1 is restricted to the side wall of the handle receiving groove 104 of the gas supply target 10, when the handle unit 5 is twisted, the second body 42 is rotated by 45° relative to the first body 41 (see FIG. 5). Accordingly, the first valve disc 424 formed at the distal end portion of the second body 42 moves in the valve opening direction, that is, moves in a direction allowing communication between the first housing hole 415 of the first body 41 and the first communication hole 414. Therefore, as shown in FIG. 5, the first valve disc 424 is separated from the valve seat, and the hydrogen gas inside the tank body 3 passes through the first communication hole 414, the gap between the first valve disc 424 and the valve seat, and the second communication hole 425 in this order, and enters the inside of the second housing hole 426 of the second body 42 (see the gray portion in FIG. 5). At this time, since the second valve disc 47 is in the closed state, the entry of the hydrogen gas into the gas supply target 10 is prevented by the second valve disc 47.

Figure 6:
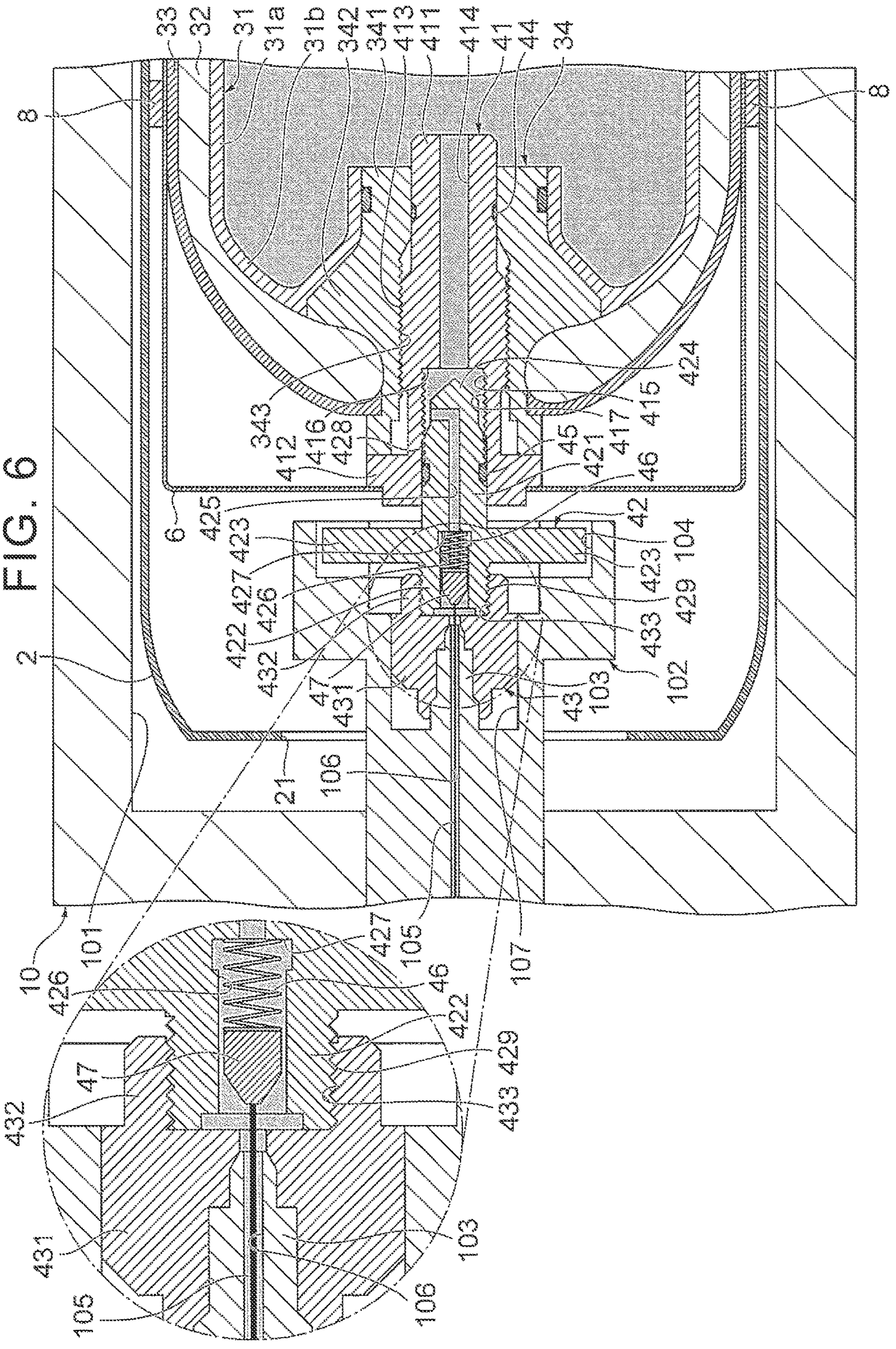
FIG. 6 is a sectional view showing how a second valve disc is opened by the pushing force of a pushing pin.

Then, when the user operates the drive mechanism on the gas supply target 10 side by, for example, button operation, the pushing pin 105 housed in the housing hole 106 protrudes from the tip of the plug portion 103, abuts against the second valve disc 47 on the high-pressure tank 1 side, and presses the second valve disc 47 in the valve opening direction against the biasing force of the spring 46 (see FIG. 6). Receiving the pushing force of the pushing pin 105, the second valve disc 47 is opened, the hydrogen gas that has entered the inside of the second housing hole 426 of the second body 42, through the gap between the housing hole 106 and the pushing pin 105, flows to the gas supply target 10 side (see gray portion in FIG. 6).

Then, when it is desired to stop the hydrogen gas, the user may stop the drive mechanism on the gas supply target 10 side by button operation. As a result, the pushing pin 105 is retracted and returns into the housing hole 106, and the second valve disc 47 is closed again by the biasing force of the spring 46. Therefore, the ingress of the hydrogen gas into the gas supply target 10 is prevented.

In addition, for example, when a gas leak occurs in the valve 4 due to a cause such as biting of a foreign substance or opening and fixing, or when it is desired to remove the high-pressure tank 1 from the gas supply target 10, the user twists the high-pressure tank 1 clockwise by, for example, 45 degrees while holding the handle unit 5, thereby releasing the locked state between the high-pressure tank 1 and the gas supply target 10. At this time, since the handle portion 423 of the high-pressure tank 1 is limited to the side wall of the handle receiving groove 104 of the gas supply target 10, the second body 42 is rotated by 45° relative to the first body 41. As a result, the first valve disc 424 of the second body 42 moves in the valve closing direction, that is, moves in a direction to block the communication between the first housing hole 415 of the first body 41 and the first communication hole 414. Therefore, the hydrogen gas inside the tank body 3 is prevented from entering the second communication hole 425 of the second body 42.

In the high-pressure tank 1 according to the present embodiment, in a state in which the handle portion 423 of the high-pressure tank 1 is fitted into the handle receiving groove 104 of the gas supply target 10, the first valve disc 424 blocks or permits communication between the first housing hole 415 and the first communication hole 414 in accordance with an operation of twisting the handle unit 5 by the user. That is, it is possible to open and close the first valve disc 424 in conjunction with the operation of twisting the handle unit 5. Therefore, the opening and closing of the first valve disc 424 can be realized only by the operation of twisting the handle unit 5 after the user inserts the high-pressure tank 1 into the guide hole 101 of the gas supply target 10. Therefore, if gas leakage occurs in the valve 4, the communication between the first housing hole 415 and the first communication hole 414 can be easily blocked by the operation of twisting the handle unit 5, and the gas leak can be stopped quickly.

Further, in a state before the high-pressure tank 1 is inserted into the guide hole 101 of the gas supply target 10 (in other words, in an unused state of the high-pressure tank 1), the first valve disc 424 blocks the communication between the first housing hole 415 and the first communication hole 414, the second valve disc 47 blocks the communication between the through hole 434 and the second housing hole 426 by the biasing force of the spring 46, that is, since the first valve disc 424 and the second valve disc 47 are both in the closed state, it is possible to enhance the robustness against the gas leakage of the second valve disc 47.

Further, when the user inserts the high-pressure tank 1 into the guide hole 101 of the gas supply target 10, since the first valve disc 424 is in a state of blocking the communication between the first housing hole 415 and the first communication hole 414, the mounting load of the high-pressure tank 1 is small, the fitting between the connector portion 43 of the high-pressure tank 1 and the fitted portion 102 of the gas supply target 10 can be more smoothly performed. Therefore, the connector portion 43 of the high-pressure tank 1 and the fitted portion 102 of the gas supply target 10 can be fitted together by one-touch, and thus the one-touch connector can be realized.

In the high-pressure tank 1 of the present embodiment, the gas is filled into the tank body 3 via the valve 4. For example, after the first valve disc 424 is opened by rotating the handle portion 423, the gas filling nozzle on the gas station side is inserted into the through hole 434 of the connector portion 43 of the valve 4, and the second valve disc 47 is pushed open at the filling pressure to fill the gas.

Although the embodiments of the present disclosure have been described in detail above, the present disclosure is not limited to the above-described embodiments, and 10 various design changes can be made without departing from the spirit of the present disclosure described in the claims.

What is claimed is:

1. A high-pressure tank, comprising:

a tank body that stores gas;

a valve mounted to the tank body; and a handle unit attached to an opposite side of the tank body from the valve, wherein the valve includes a first body mounted in a boss portion of the tank body and having, inside the first body, a first communication hole and a first housing hole, the first communication hole communicating with inside of the tank body, and the first housing hole communicating with the first communication hole and having a larger diameter than the first communication hole, a second body having, inside the second body, a second communication hole and a second housing hole and including a first valve disc, the second communication hole communicating with the first housing hole, the second housing hole communicating with the second communication hole and having a larger diameter than the second communication hole, and the first valve disc being housed in the first housing hole and configured to block or allow communication between the first housing hole and the first communication hole, a connector portion connected to the second body and having, inside the connector portion, a through hole communicating with the second housing hole, the connector portion being configured to be fitted in a gas supply target to which the gas is to be supplied, a second valve disc housed in the second housing hole, the second valve disc being configured to block communication between the through hole and the second housing hole by a biasing force of a spring, and configured to allow the communication between the through hole and the second housing hole by a pushing force of a pushing pin of the gas supply target, and a handle portion protruding from the second body in a radial direction of the tank body, the handle portion being configured to be fitted in a handle receiving groove of the gas supply target when the high-pressure tank is fitted in the gas supply target via the connector portion, and with the handle portion fitted in the handle receiving groove of the gas supply target, the first valve disc blocks or allows the communication between the first housing hole and the first communication hole with an operation of twisting the handle unit.

* * * * *